United States Patent [19]
Shibasaki et al.

[11] Patent Number: 5,749,662
[45] Date of Patent: May 12, 1998

[54] PRINTING METHOD FOR RECORDING APPARATUS WITH MULTIPLE PRINT HEADS

[75] Inventors: Souhei Shibasaki; Yukio Sawano, both of Tokyo; Shuzo Hanaoka; Hiroyoshi Takano, both of Nagano, all of Japan

[73] Assignee: Fuji Photo Film Co., Ltd., Kanagawa, Japan

[21] Appl. No.: 763,784

[22] Filed: Dec. 11, 1996

[30] Foreign Application Priority Data

Dec. 15, 1995 [JP] Japan .................. 7-348036
Dec. 15, 1995 [JP] Japan .................. 7-348037

[51] Int. Cl.⁶ .................................................. B41J 3/54
[52] U.S. Cl. .................................. 400/82; 400/279
[58] Field of Search .......................... 400/82, 61, 76, 400/279, 320, 323

[56] References Cited

U.S. PATENT DOCUMENTS

| | | | |
|---|---|---|---|
| 4,608,575 | 8/1986 | Morgan | 400/82 |
| 4,655,622 | 4/1987 | Aoki | 400/61 |
| 4,660,052 | 4/1987 | Kaiya | 400/82 |
| 4,977,410 | 12/1990 | Onuki | 400/82 |
| 5,003,323 | 3/1991 | Onuki | 400/82 |
| 5,450,099 | 9/1995 | Stephenson et al. | 400/82 |
| 5,488,397 | 1/1996 | Nguyen | 400/82 |

FOREIGN PATENT DOCUMENTS

7143332  6/1995  Japan .................. 400/82

*Primary Examiner*—Edgar S. Burr
*Assistant Examiner*—Steven S. Kelley
*Attorney, Agent, or Firm*—Birch, Stewart, Kolasch & Birch, LLP

[57] ABSTRACT

A printing method for performing enlargement printing of one continuous line by simultaneously shifting a plurality of printing heads by a shifting magnitude. The shifting magnitude of the printing heads is set to be greater than a shifting magnitude utilized in standard printing. Dividing points for shifting traces of each of the printing heads are set such that the shifting traces of adjacent printing heads partially overlap one another. Divided printing zones are established between the dividing points, and the printing timing of the printing heads is controlled for performing the enlargement printing of the one continuous line. Additionally, a printing method for performing reduction printing of one continuous line is performed by setting a shifting magnitude of the printing heads to be equal to that used in standard printing. Divided printing zones are established to be printed by at least two printing heads in a non-overlapping manner. The printing timing of the respective printing heads is controlled for performing a reduced printing of the one continuous line.

14 Claims, 7 Drawing Sheets

PRINTING METHOD FOR RECORDING APPARATUS WITH MULTIPLE PRINT HEADS

BACKGROUND OF THE INVENTION

1. Field of the Invention

The present invention relates to a printing method for a recording apparatus suitable for employing an enlarging copy machine for printing an image data read from an original with enlarging.

2. Description of the Related Art

Conventionally, an enlarging copy machine for printing an image read from an original of A4 size of so forth with enlarged magnification into a larger size, such as A1 size or so forth, has been known in Japanese Unexamined Patent Publication (Kokai) No. Heisei 7-143332.

Figure 8:
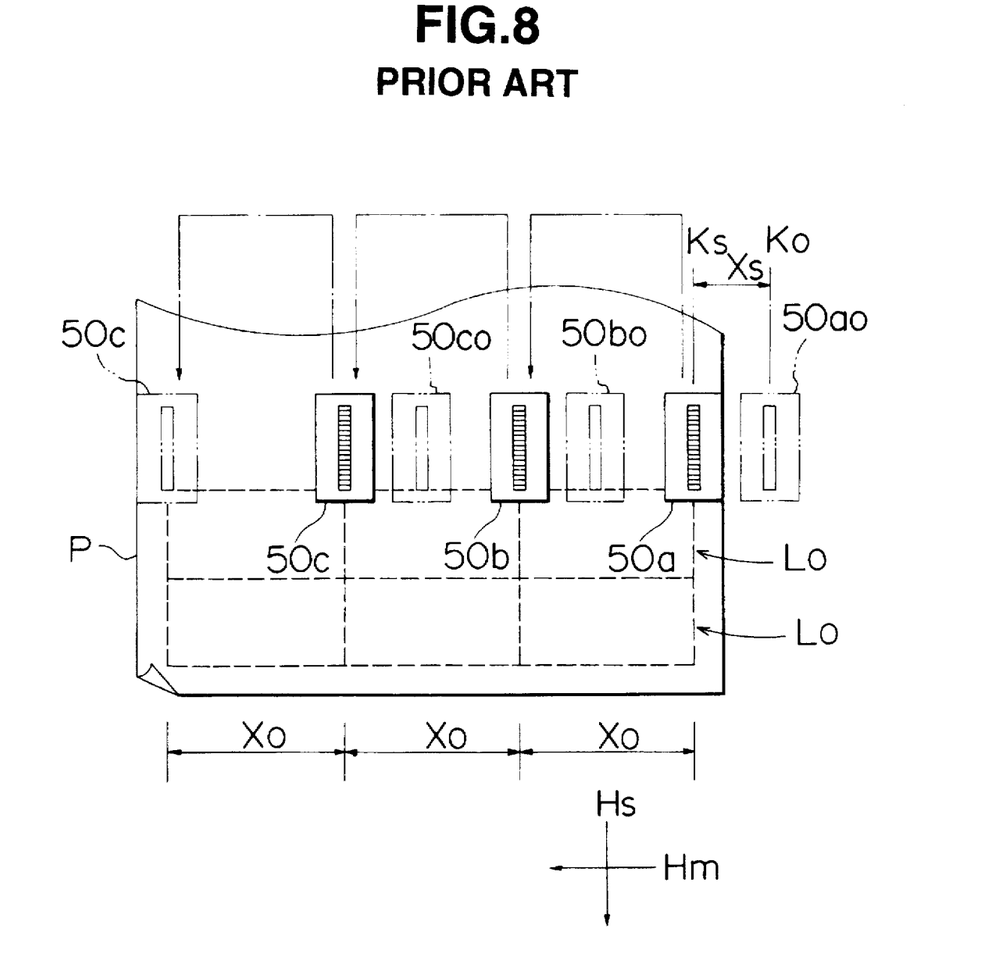
FIG. 8 is an explanatory illustration showing the conventional printing method.

The enlarging copy machine of this kind has a plurality of (three) printing heads 50a, 50b and 50c arranged with a given interval Xo as shown in FIG. 8, and has a function to perform printing a continuous one line Lo on a recording paper P by simultaneously shifting respective printing heads 50a, . . . for a the interval Xo in a primary scanning direction Hm (arranging direction), and to perform printing sequentially per one line Lo . . . by shifting the recording paper P in an auxiliary scanning direction Hs perpendicular to the primary scanning direction Hm.

On the other hand, in this type of enlarging copy machine, home positions of respective printing heads 50a . . . are set at positions ahead of printing start position for a distance Xs. In FIG. 8, Ks is a printing start position of the head 50a, Ko is a home position of the printing head 50a, 50ao, 50bo and 50co are respective printing heads positioned at home positions. In this case, a distance Xs serves as entrance length of each printing head 50a. By this entrance length, upon starting of shifting of respective printing heads 50a . . . temporarily occurring transitional behavior, such as vibration, deviation or so forth due to inertia of the printing head 50a . . . and initiation of driving of the driving motor, can be eliminated to avoid influence for printing quality of one line Lo.

However, in the above-mentioned printing method of the conventional enlarging copy machine (recording apparatus), a problem to be solved is inherently encountered in that since the overall length of one line Lo is determined in straightforward depending upon number of the printing heads 50a . . . and the mutual interval Xo between the printing heads 50a . . . , the recording paper P to be printed can be limited to single size, and when a size of the original is constant, an enlarging magnification is limited to single magnification.

Also, a task to be solved resides in that the distance Xs is limited by the size of the enlarging copy machine or internal structure, compromising is inherent, and thus, sufficient entrance length cannot be certainly provided, and printing quality cannot be enhanced.

SUMMARY OF THE INVENTION

It is an object of the present invention to provide a printing method for a recording apparatus which can modify size of recording paper to be printed and perform enlarging and minifying printing even in the recording apparatus having a plurality of printing head arranged with a given interval, for providing enhanced diversification and convenience.

On the other hand, another object of the present invention is to provide a printing method for a recording apparatus, in which sufficient entrance length can be certainly provided, with avoiding influence of transitional behavior, such as vibration, deviation and so forth upon initiation of shifting of the printing head, to enhance printing quality significantly.

In order to accomplish the above-mentioned object, according to the present invention, a printing method of a recording apparatus for performing standard printing of a continuos one line by simultaneously shifting a plurality of printing heads arranged at a given interval in a primary scanning direction which is a direction of arrangement of the printing heads in a predetermined shifting magnitude, comprises the steps of performing enlarging process for an image data upon the standard printing, setting shifting magnitude of the printing heads on one line in the primary scanning direction to be greater than that in the standard printing, setting divided printing zones to be printed by the printing head in non-overlapping manner, with respect to the enlarged one line, and controlling printing timing of respective printing heads for performing enlarging printing for the continuous one line.

In this case, respective divided printing zones are set at equal length relative to each other. The dividing points for setting respective of the divided printing zones is desirably set within an overlapping range of shifting traces of respective of the printing heads. A white data is printed in overlapping range of shifting traces of respective of the printing heads. The white data is preliminarily stored in a memory together with the image data.

On the other hand, minifying printing is performed by performing minifying process for an image data upon the standard printing, setting shifting magnitude of the printing heads on one line in the primary scanning direction to be equal to that in the standard printing, setting divided printing zones to be printed by all of or part of the printing heads in non-overlapping manner, with respect to the shortened one line, and controlling printing timing of respective printing heads for performing minifying printing for the continuous one line.

A printing head not being used among the respective printing heads is released to a position not contacting with a recording paper. For example, the printing head not being used is released when a recording paper smaller than a recording paper to be used upon standard printing is selected.

Furthermore, according to another aspect of the invention, a printing method for a recording apparatus for performing printing for a length of one continuous line which can be printed when a plurality of printing head arranged with a given interval are simultaneously shifted in a primary scanning direction which is a direction of arrangement of the printing heads, in a predetermined shifting magnitude, comprises the steps of setting the interval of the printing head shorter than the predetermined shifting magnitude in a predetermined distance (first entrance length), setting shifting magnitude of the printing head longer than the predetermined shifting magnitude in a predetermined distance (second entrance length), upon printing, performing printing by the printing head which performs printing from the beginning end of the one line, from a beginning end of the one line to a shifting end position of the printing head, and performing printing from positions on the way of shifting of printing heads to shifting end position of the printing head by other printing head.

By this, in addition to the original entrance length, practical entrance lengths of the printing heads becomes longer in the extent of a sum of the first entrance length Xf and the second entrance length Xr.

When the first entrance length is Xf, the second entrance length is Xr and when number of the printing heads is N, a relationship of Xr=(N−1) Xf is set. A sum length of the first entrance length Xf and the second entrance length Xr is desirably set at a length for stabilizing a transitional behavior upon initiation of shifting of the printing head. On the other hand, a white data is printed within an overlapping range of shifting traces of the printing heads. It should be noted that the white data is preliminarily stored in a memory together with an image data.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DETAILED DESCRIPTION OF THE PREFERRED EMBODIMENT

Next, the present invention will be discussed hereinafter in detail in terms of the preferred embodiments of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 5:
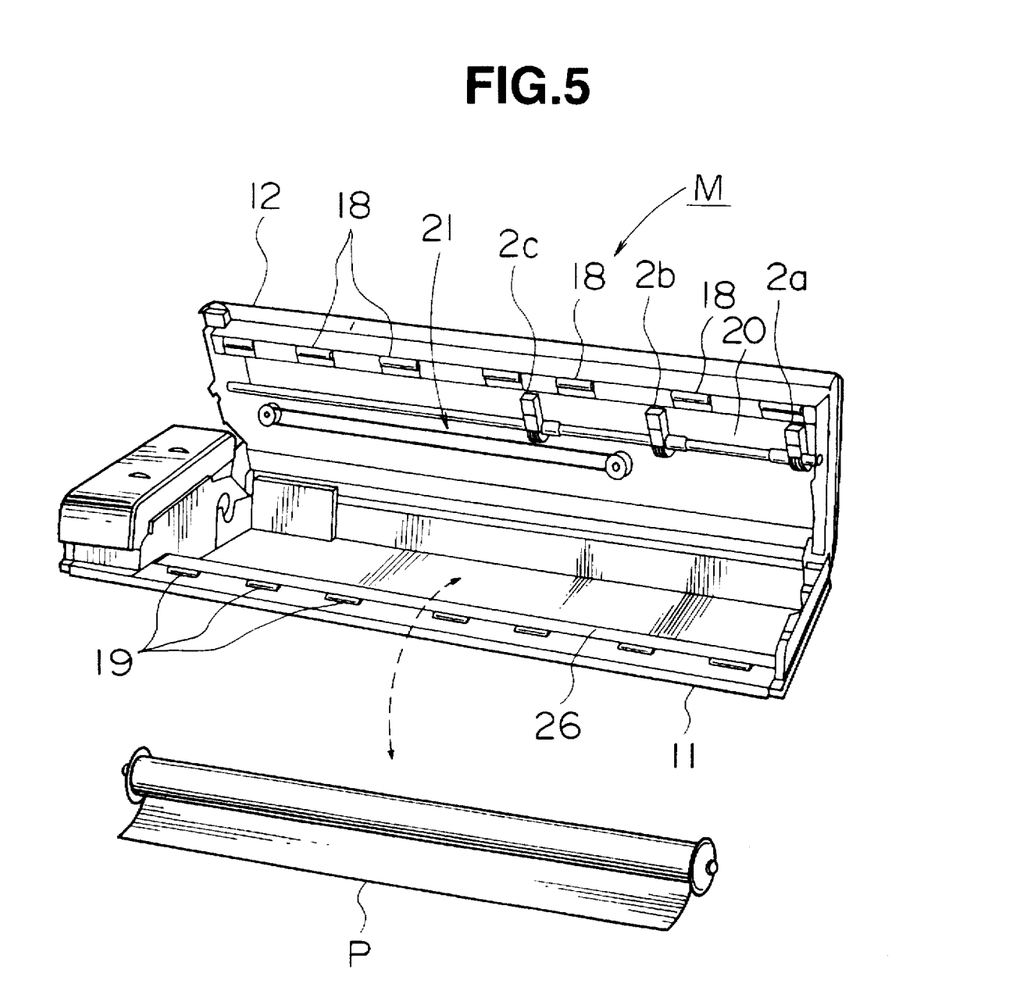
FIG. 5 is a perspective view showing an enlarging copy machine employing the recording apparatus in a condition where a printer cover thereof is opened.

At first, an enlarging copy machine M employing a recording apparatus 1 which can implement a printing method according to the present invention, will be discussed with reference to FIGS. 5 to 7.

Figure 6:
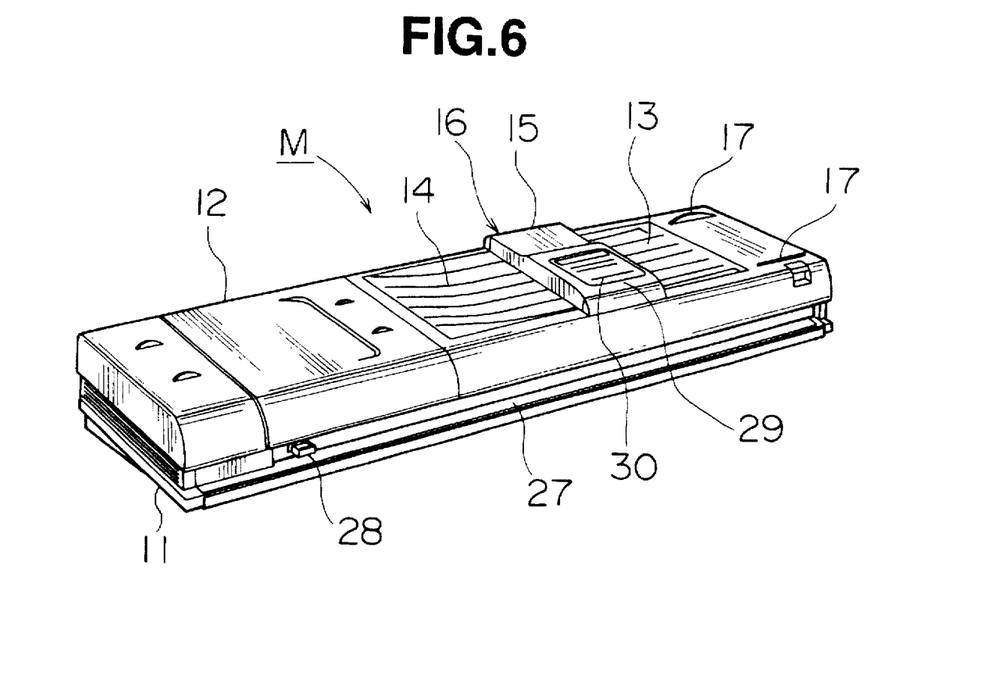
FIG. 6 is an external perspective view of an enlarging copy machine employing the recording apparatus.
Figure 7:
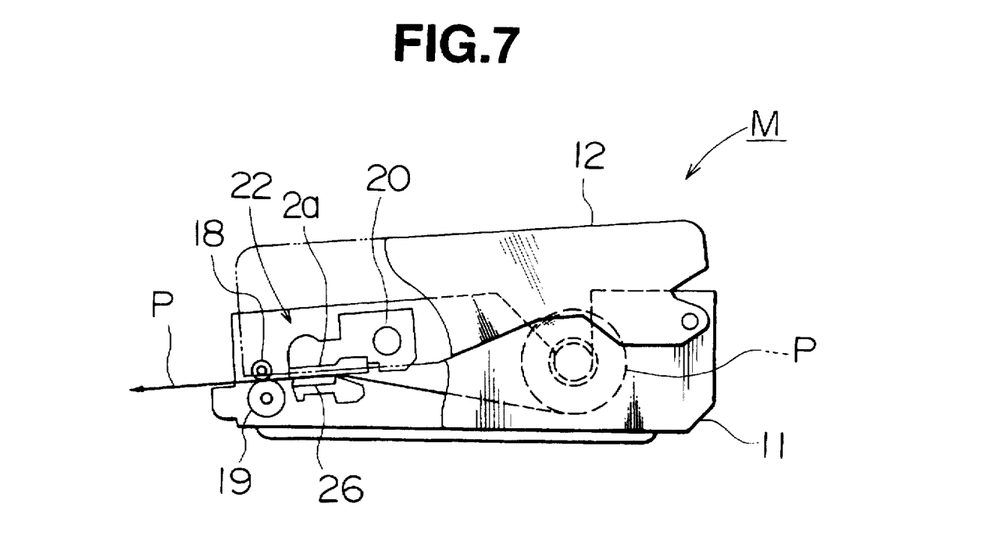
FIG. 7 is a partially cut-out side elevation of the enlarging copy machine employing the recording apparatus.

As shown in FIG. 6, an enlarging copy machine M has a lower main body 11 of a printer and an upper printer cover 12. As shown in FIG. 5, the printer cover 12 can open and close a front portion of the printer main body 11. On the upper surface of the printer cover 12, a concave original setting base 13 and an original tray 14 are provided. Between the original setting base 13 and the original tray 14, an original reading portion 16 covered with a scanner cover 15 is arranged/It should be noted that the reference numeral 17 . . . denote original guide.

On the other hand, as shown in FIGS. 15 and 17, within the inside of the printer main body 11, a recording paper (roll paper) O is rotatably loaded. On the other hand, at the front end of the inside of the printer cover 12, a plurality of pinch rollers 18 . . . are arranged. Also, at the front end of the inside of the printer main body 11, a plurality of feeder rollers 19 . . . are arranged. Furthermore, on the inner surface of the printer cover 12 at a position between the pinch rollers 18 . . . and the loaded recording paper P, a head unit 22 which is slidably supported on guide shafts 20 and reciprocally driven on the guide shafts 20 by a traveling mechanism 21. The head unit 22 has three printing heads 2a, 2b and 2c arranged with a given interval. On the other hand, on the inner surface, a platen rubber 26 is arranged at a position between the feeder rollers 19 . . . and the loaded printing paper P. By this, upon closure of the printer cover 12, the pinch rollers 18 . . . and the feeder rollers 19 . . . are held in contact with each other. In conjunction therewith, the printing heads 2a, 2b and 2c and the platen rubber 26 are held in contact.

On the other hand, at the front face of the enlarging copy machine, a clearance between the printer main body 11 and the printer cover 12 serves as a printed paper outlet 27. By this, the recording paper P is fed with passing between the printing heads 2a, 2b and 2c and the platen roller 26 and between the pinch rollers 18 . . . and the feeder rollers 19 . . . and is externally ejected through the printed paper outlet 27. It should be noted that the reference numeral 28 denotes a cutter for cutting the printing paper P to be ejected by sliding in transverse direction. Also, the reference numeral 29 denotes an operation panel including a display portion arranged on the upper surface of the scanner cover. A keyboard 30 may be provided.

Figure 4:
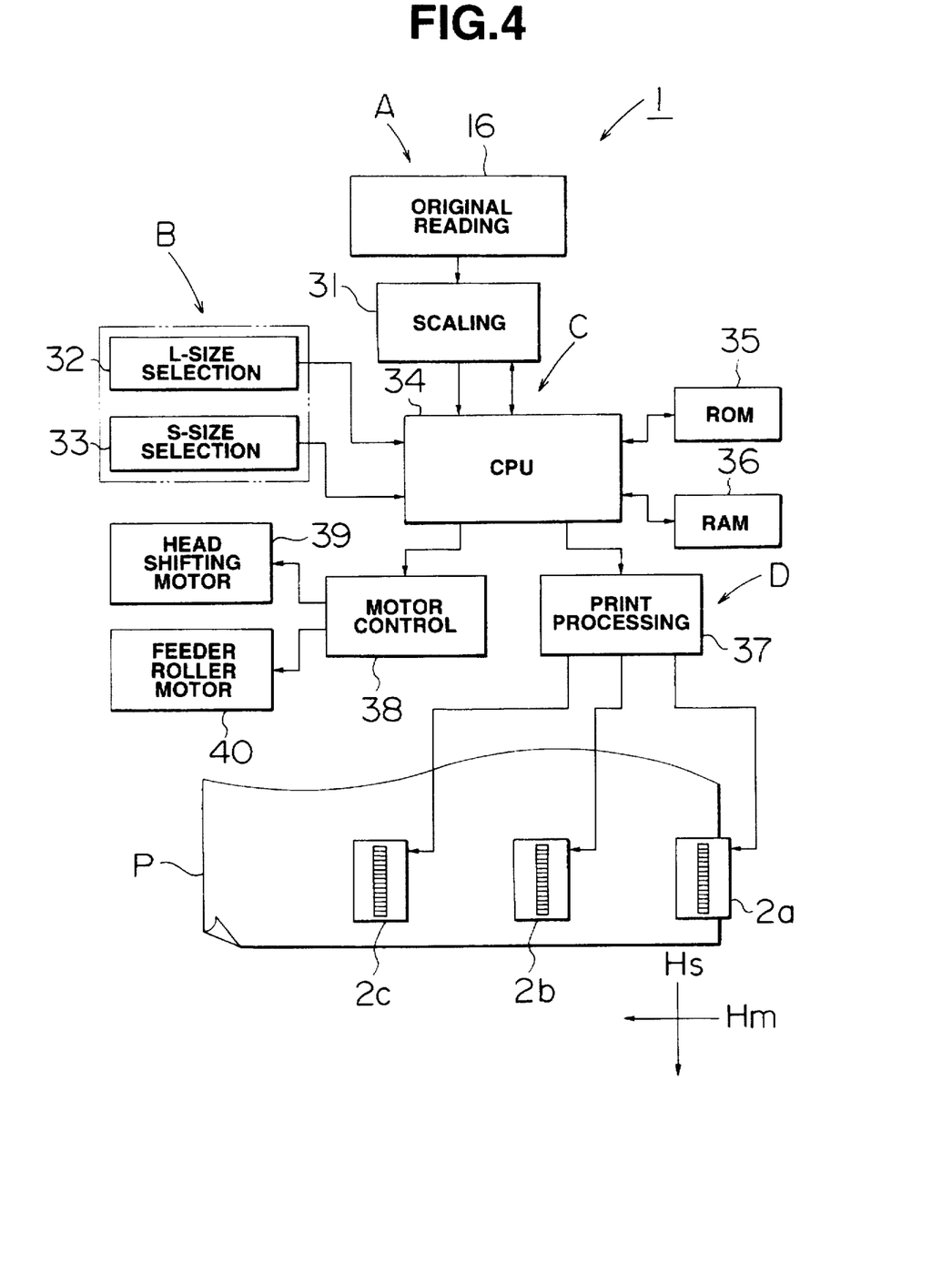
FIG. 4 is a block diagram showing a recording apparatus which can implement the printing method according to the present invention.

Next, a signal processing system of the enlarging copy machine will be discussed with reference to FIG. 4.

The signal processing system generally comprises a reading processing portion A, an operation processing portion B, a control processing portion C and a printing processing portion d.

The reading processing portion A includes the original reading portion 16 including an image sensor. The original reading portion 16 performs necessary data processing, such as A/D conversion and so forth, for an image read by the image sensor. The obtained image data is then subject to enlarging process or minification process, and is subsequently applied to the control system C.

On the other hand, the operation processing system B includes an enlarging printing selection input portion 32 for selecting an enlarging printing mode relative to a standard printing mode, a minifying printing selection input portion 33 for selecting a minifying printing mode relative to the standard printing mode, and ten-keys and various function keys arranged on the operation panel 29. It should be noted that respective input portions 32 and 33 may be realized by the keyboard arranged on the operation panel, for example.

Also, the control processing system C has a central control unit 34 including a CPU or so forth, a ROM 35 storing control programs, a RAM for storing variety of data, such as an image data. The control processing system governs overall enlarging copy machine.

On the other hand, the printing processing system D includes a printing processing portion 37 including a RAM or so forth for temporarily storing the image data (printing data) for one line, and the printing heads 2a, 2b and 2c. By this, the image data to be printed is applied to respective printing heads 2a, 2b, 2b .... In the shown case, the printing heads 2a ... may be a serial type thermal head arranged a plurality of printing elements (heating elements). On the other hand, respective printing heads 20a ... performs printing with scanning in arrangement direction of the printing element (heating element). This direction becomes a primary scanning direction Hm. On the other hand, the printing processing system D includes a motor control portion 38, a head shifting motor 39, a feeder roller driving motor 40. The head shifting motor 39 incorporates the traveling mechanism 21 and reciprocally drives (scans) the printing heads 2a .... In conjunction therewith, the feeder roller driving motor 40 drives the feeder rollers 19 ... for intermittently feeds the recording paper P. Respective of the motors 39 and 40 are controlled by the motor control portion 38 on the basis of a control command from the central control unit 34. By this, the recording paper P is intermittently fed in a direction perpendicular to the primary scanning direction Hm for printing in line-by-line. The feeding direction of the recording paper P perpendicular to the primary scanning direction is referred to as auxiliary scanning direction Hs.

Figure 1:
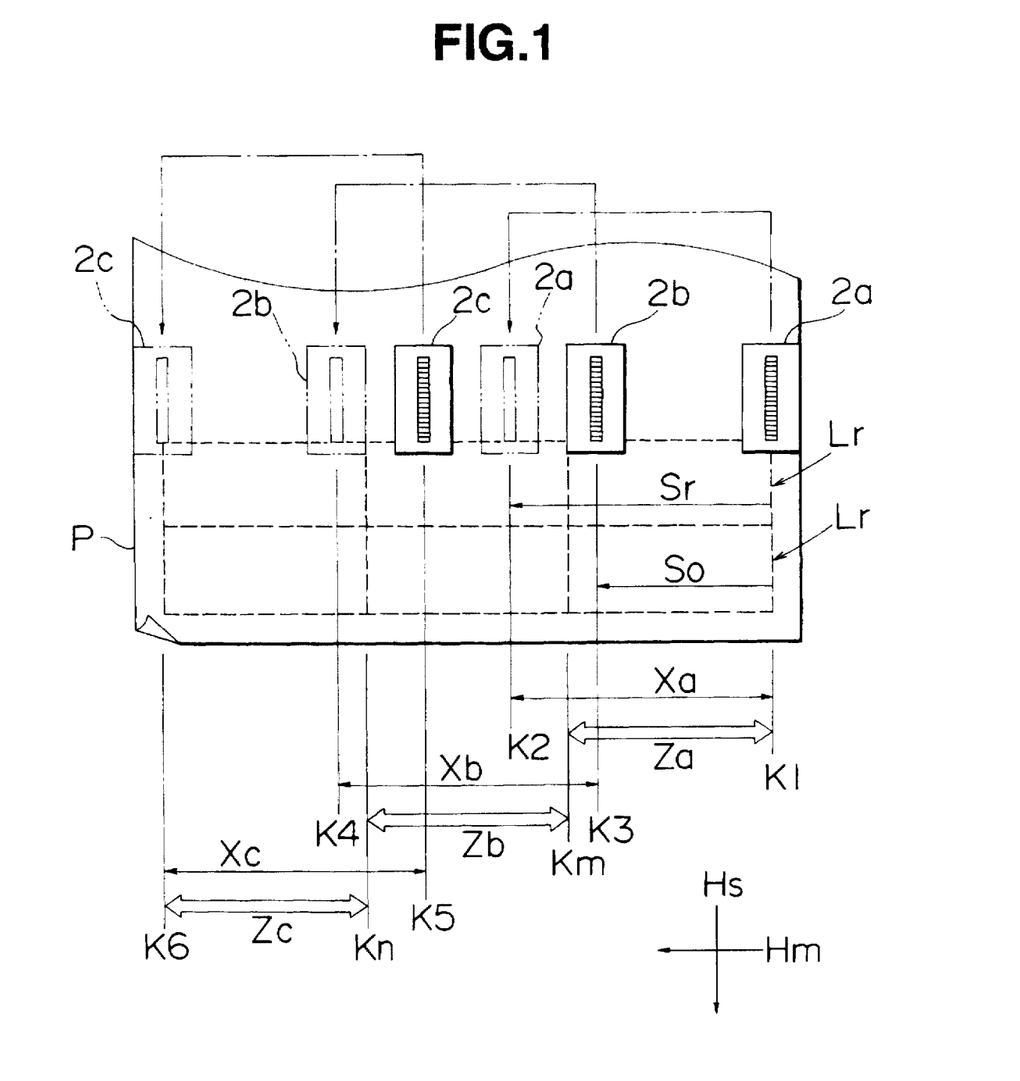
FIG. 1 is an explanatory illustration in the case where an enlarging printing is performed by a printing method according to the present invention.
Figure 2:
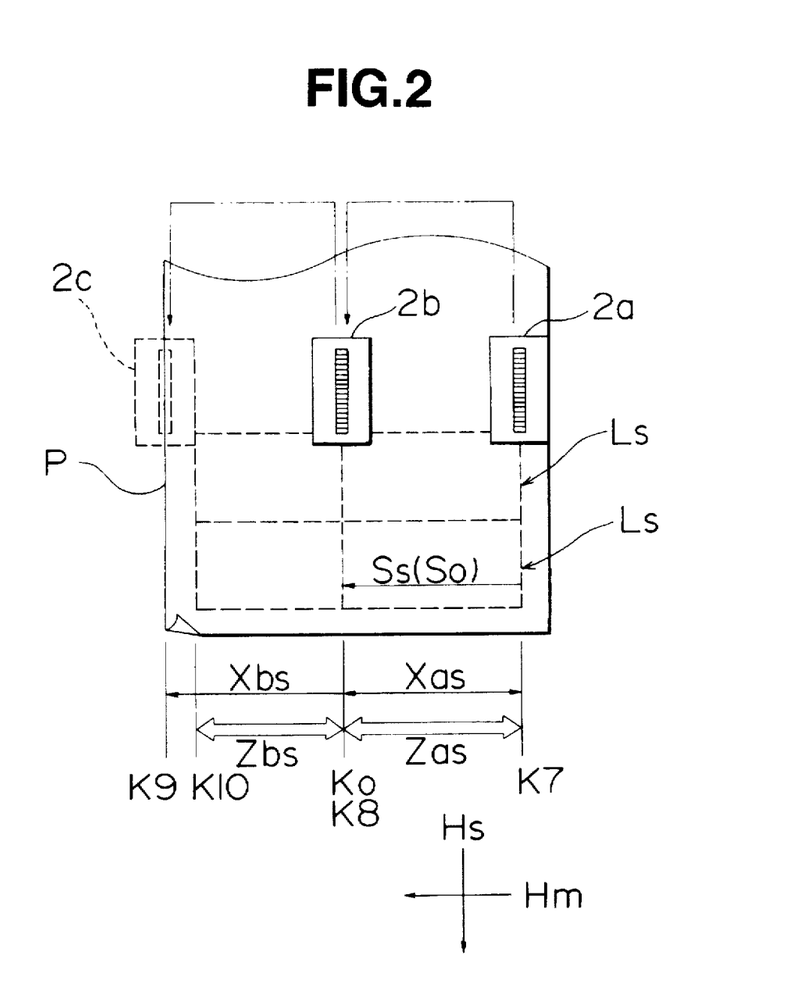
FIG. 2 is an explanatory illustration in the case where a minifying printing by a printing method in another embodiment of the present invention.

Next, discussion will be given for the recording apparatus (enlarging copy machine) implementing the shown embodiment of the printing method with reference to FIGS. 1, 2 and 3.

At first, a standard printing is performed by shifting respective printing heads 2a, 2b and 2c in the primary scanning direction Hm in the extent corresponding to a distance (shifting magnitude So) corresponding to the interval between the printing heads 2a and 2b. By this, standard printing force a continuous one line can be performed on the recording paper P/ On the other hand, once printing in the primary scanning direction Hm for one line is completed, the recording paper P is fed in the auxiliary scanning direction in a magnitude corresponding to one line in the primary scanning direction. Thus standard printing is performed in line-by-line/ In the standard printing, the image data read from A4 size original is printed with enlarging to A1 size as standard size.

Next, enlarging printing will be discussed with reference to FIG. 1. The enlarging printing is performed by selecting an enlarging printing mode by the enlarging printing selection input portion 32. At first, the image data is processed for enlarging magnification for enlarging into the given magnification adapted for standard printing. On the other hand, a shifting magnitude Sr of the printing heads 2a ... in one line is enlarged in proportion to the predetermined magnification with respect to the shifting magnitude So upon standard printing.

On the other hand, since one line Lr becomes a length enlarged corresponding to the predetermined magnification relative to that upon standard printing. With respect to the enlarged one line Lr, a divided printing zones Za, Zb and Zc which are to be printed respectively by the printing heads 2a, 2b and 2c, and are not allowed to overlap to each other, are set. The length of respective divided printing zones Za, Zb and Zc can be arbitrarily set at any length which can be printed by respective printing heads. However, in order not to cause substantial difference of life of the printing heads 2a ..., it is desirable to be set at equal length relative to each other. On the other hand, depending upon the length of respective divided zone Za, Zb and Zc, assignment of the image signals to respective printing heads 2a, 2b and 2c.

Then, upon printing, respective printing heads 2a, ... are shifted in the primary scanning direction. Also, printing timing of respective printing heads 2a, 2b and 2c of respective printing heads 2a, 2b and 2c for performing printing on the divided printing zones Za, Zb and Zc. Namely, the printing head 2a performs printing from a starting point K1 of one line Lr to for a distance Xa. The printing head 2b performs printing from an intermediate point K3 of one line Lr to an intermediate point K4 for a distance Xb. Also, the printing head 2c performs printing from an intermediate point K5 of one line Lr to an end point K6 for a distance Xc. Therefore, the printing heads 2a, 2b and 2c performs printing for respectively corresponding printing zones Za, Zb and Zc.

In concrete, the printing head 2a starts printing of the normal image data from the starting point Ki of one line Lr and terminates printing of the normal image data at the end point (dividing point Km) of the divided printing zone Za. Also, from the dividing point Km to the shifting end point K2 of the printing head 2a, printing of white data is performed.

On the other hand, the printing head 2b starts printing of white data from the intermediate point K3 as shifting start point, and starts printing of the normal image data at the starting point of the divided printing zone Zb located on the way of shifting and terminates printing of the normal image data at the end point (dividing point Kn) of the divided printing zone Zb located on the way of shifting. From the dividing point Kn to the shifting end point (K4) of the printing head 2b, white data is printed.

On the other hand, the printing head 2c starts printing of white data from the intermediate point K5 as shifting start point, and starts printing of the normal image data at the starting point of the divided printing zone Zc located on the way of shifting and terminates printing of the normal image data at the end point (dividing point Kn) of the divided printing zone Zc located on the way of shifting. From the dividing point Kn to the shifting end point (K6) of the printing head 2b, which K6 is the end point of one line Lr, white data is printed.

As set forth above, in the overalpping ranges of shifting traces of respective printing heads 2a, 2b and 2c, printing of the white data to as not to print nothing. Therefore, on the recording paper P, the continuous one line Lr is printed. It should be noted that the white data is preliminarily stored in a memory together with the image data. This one line Lr becomes a length in the extent corresponding to the predetermined magnification, in comparison with the one line in standard printing. On the other hand, every time of completion of printing for one line in the primary scanning direction Hm, the recording paper P is intermittently driven to be fed for one line. By this, on the recording paper P is printed in line-by-line basis. It should be noted that the overall shifting magnitude in the auxiliary scanning direction Hs becomes greater depending upon the predetermined magnification relative to the standard printing.

On the other hand, in such printing method, printing of the printing heads 2b and 2c are started after shifting of the printing heads 2b and 2c for a distance corresponding to the predetermined distance. Therefore, the transitional behavior, such as vibration, deviation and so forth due to inertial of the printing heads 2a ... and actuation of the driving motor, which is caused intermittently, can be eliminated so that such transitional behavior will never affect for printing quality.

Next, discussion will be given with respect to minifying printing with reference to FIG. 2. The minifying printing is performed in response to selection of the minifying printing through the minifying printing selection input portion 33. At first, the image data is minified in the predetermined magnification with respect to that of standard printing. The shifting magnitude Ss on one line of the printing head 2a is set to the same shifting magnitude So relative to the standard printing. Furthermore, in the minifying printing mode, it is possible that certain printing head is not used. The printing head not in use is released to the position not to contact with the printing head. FIG. 2 shows the case where the printing head 2c is not used. Releasing of the printing head 2c may be performed manually, or automatically by a predetermined actuator upon selection of the recording paper P having smaller size than the recording paper P upon the standard printing, or when the minifying printing mode is selected by the minifying printing selection input portion 33.

By this, one line Ls becomes a length to be shortened in the extent corresponding to the predetermined magnification relative to that upon standard printing. Therefore, with respect to one line Ls, the divided printing zones Zas and Zbs which do not overlap with each other for printing by respective printing heads 2a and 2b, are set. In this case, a dividing point Ko is consistent with the motion starting point on one line of the printing head 2b. Also, depending upon minifying magnification, fractions of the image data are assigned for respective printing heads 2a . . .

Then, upon printing, respective printing heads 2a and 2b are shifted in the primary scanning direction Hm, and in conjunction therewith, printing timings of the printing heads 2a and 2b are controlled respectively to perform printing in respective of the divided printing zones Zas and Zbs by the printing heads 2a and 2b. Namely, the printing head 2a is shifted from the starting point K7 of one line Ls to the shifting start point K8 in a distance Xas and the printing head 2b is shifted from the shifting start point K8 to a shifting end point K9 in a distance Xbs (Xbs=Xas). Respective printing heads 2a and 2b performs printing for respective of corresponding divided printing zones Zas and Zbs during shifting.

In concrete, the printing head 2a starts printing of the normal image data from the starting point K7 and terminates printing at the shifting start point K8 of the printing head 2b. On the other hand, the printing head 2b starts printing at the shifting start point K8 and terminates printing at a printing end point K10 located on one line on the way of shifting thereof. The printing head 2b further performs printing of the white data from the printing end point K10 to the shifting end point K9.

Thus, on the recording paper P, printing of the continuous one line Ls can be performed. The one line Ls has a length shortened in comparison with the length of one line in standard printing in the extent corresponding to the predetermined magnification. Also, every time of completion of printing for one line in the primary scanning direction, the recording paper P is shifted in the auxiliary scanning direction Hs intermittently. By this, printing of respective lines can be performed sequentially in line-by-line on the recording paper P. It should be noted that overall shifting magnitude in the auxiliary scanning direction Hs becomes shorter in comparison with that in the standard printing in the extent corresponding to the predetermined magnification.

Next, a printing method enhancing printing quality will be discussed with reference to FIG. 3. The shown method is an application of the enlarging printing method as set forth above.

This printing method is applied in the case of printing for one continuous line L by simultaneously shifting a plurality of the printing heads 2a, 2b and 2c arranged with a given interval, in the primary scanning direction Hm (printing head arranging direction) in a given magnitude.

At first, the distance between respective printing heads 2a, 2b and 2c is set to be shorter than a given printing length X in the primary scanning direction Hm of respective printing heads in a predetermined distance, i.e. a first entrance length Xf. Accordingly, when the printing head 2a is positioned at a starting position KS of one line Ls shown FIG. 3, the printing head 2b is arranged at a position Kb shifted from a normal position Kpb toward the printing head 2a in the extent corresponding to the first entrance length Xf. Also, the printing head 2c is arranged at a position Kc shifted from a normal position Kpc toward the printing head 2a in the extent corresponding to double of the first entrance length Xf (Xf×2).

On the other hand, the shifting magnitude of respective printing heads 2a, 2b and 2c is set to be longer than the given printing length X in the extent of a second entrance length Xr. Then, printing zones Zac, Zbc and Zcc to be assigned for respective printing heads 2a, 2b, 2c are set in the following manner. At first, from the starting position Ks of the one line Ls to the shifting end position Kea of the printing head 2a is assigned to the printing head 2a as the assigned printing zone Zac. On the other hand, from a position Kmb located on the way of shifting of the printing head 2b and corresponding to the shifting end porition Kea of the printing head 2a to the shifting end position Keb of the printing head 2b is assigned to the printing head 2b as the assigned printing zone Zbc. Also, from a position Kmc located on the way of shifting of the printing head 2c and corresponding to the shifting end porition Keb of the printing head 2b to the shifting end position (end position of one line L) Ke is assigned to the printing head 2c as the assigned printing zone Zcc.

In this case, for facilitating control, it is desirable to set Zbc=Zcc. By this, $$Xr=2Xf \quad \ldots (1)$$

is established. On the other hand, since the shifting distances Sa, Sb and Sc of respective printing heads 2a, 2b, and 2c are Sa=Sb=Sc, the shifting distance Sa of the printing head 2a becomes Sa=X+Xr, the shifting distance Sb of the printing head 2b becomes Sb=X+Xf+(Xr/2) and the shifting distance Sc of the printing head 2c becomes Sc=X+Xf.

Here, a sum length Xi (=Xf+Xr) of the first entrance length Xf and the second entrance length Xr becomes an actual entrance length of the printing heads 2b and 2c which is additionally set in accordance with the present invention. Accordingly, the magnitude of the sum length Xi is selected to be sufficient for stabilizing transitional behavior, such as vibration, deviation or so forth upon initiation of shifting of the printing heads 2a . . . . It should be appreciated thay the magnitude of the sum length Xi may be determined though experiments. By this, when Xi=15 mm is determined as an optimal value, for example, from the foregoing equation (1), the first entrance length Xf can be set as Xf=15/3=5 mm, and the second entrance length Xr can be set as Xr=15×2/3=10 mm. While the foregoing embodiment shows an example employing three printing heads 2a, 2b and 2c, in general, when N in number of printing heads are employed, a relationship $$Xr=(N-1)Xf$$

can be established.

Figure 3:
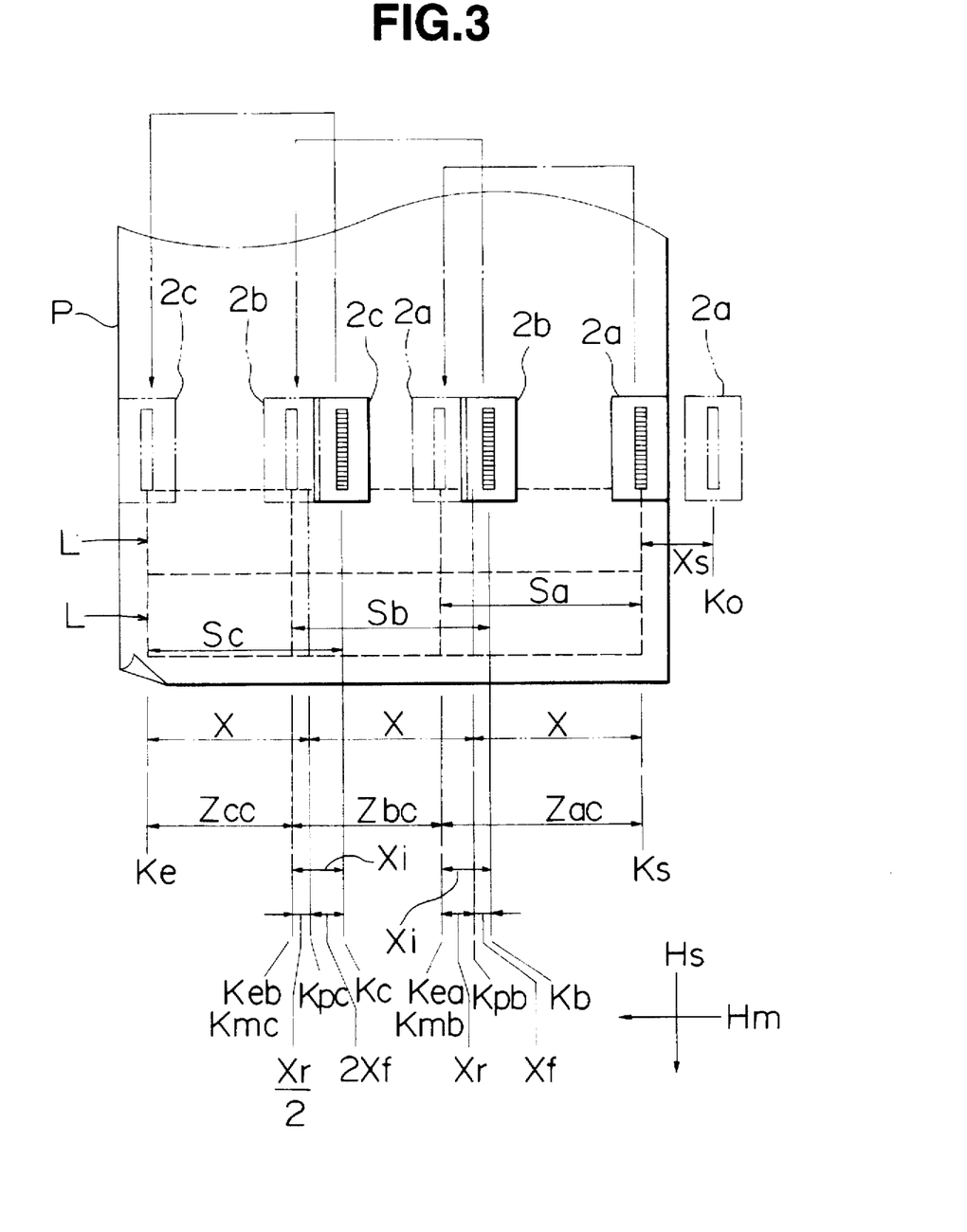
FIG. 3 is an explanatory illustration in the case where printing is performed by another embodiment of a printing method according to the invention.

Therefore, upon printing, as shown in FIG. 3, respective printing heads 2a, 2b and 2c are shifted from the home position (the position Ko of the printing head 2a) in the primary scanning direction, and, in conjunction therewith, the printing timings of respective printing heads 2a, 2b, 2c are controlled to perform printing. In this case, at first, the printing heads 2a, 2b and 2c are initially shifted from their home positions in the extent of original entrance length Xs. Then, if the printing head 2a reaches the starting end position Ks of the one line L, printing of the printing head 2a is initiated from the starting end position Ks. When the printing heads 2a . . . are shifted in the distance corresponding to the sum length Xi as sum of the first entrance length Xf and the second entrance length Xr, and thus respective printing heads 2b and 2c reaches respective of mid-way positions Kmb and Kmc, printing by the printing heads 2b and 2c is initiated. On the other hand, when respective printing heads 2a, 2b and 2c reach respective shifting end positions Kea, Keb and Ke, printing for one like L is terminated. By this, one line L can be printed without causing any overlapping. It should be noted that the overlapping ranges of traces of shifting of respective printing heads 2a, 2b and 2c may be printed with the white data as in the enlarging printing set forth above. The white data may be preliminarily stored in the memory together with the image data.

On the other hand, when printing in the primary scanning direction Hm is completed, the recording paper P is fed intermittently in the auxiliary direction Hs for line feeding at every end of primary scanning cycle for the line in the primary scanning direction Hm. By this, lines are sequentially printed on the recording paper P in line-by-line. With the enlarging copy machine of the present invention, the image data read from the original of A4 size or so forth can be printed in enlarged magnification on the paper of A1 size or so forth.

With the printing method as set forth above, the entrance length of the printing head 2a is only the original entrance length Xs and thus is held unchanged with respect to that in the conventional printing method. However, the entrance length of other printing heads 2b and 2c becomes longer than the original entrance length Xs in the extent of the sum length Xi as sum of the first entrance length Xf and the second entrance length Xr. Therefore, the actual entrance length of these printing heads 2b and 2c becomes Xs+Xf+Xr. As set forth above, since the sum length Xi is selected to be sufficient for stabilizing temporarily occurring transitional behavior, such as vibration, deviation and so forth, upon initiation of shifting of the printing heads 2a . . . , degradation of printing quality of the printing heads 2b and 2c can be successfully avoided. Thus, printing quality can be enhanced. In this case, while the improvement of the printing quality at initial stage of printing is not applicable for the printing head 2a, since the influence of the transitional behavior on the printing head 2a is caused at the beginning end of the line L, actual degradation of printing quality is in ignoble level. Also, since improvement is applied for the printing heads 2b and 2c which perform printing in the central portion of the image for avoiding influence of the transitional behavior thereof, printing quality of the overall image can be significantly enhanced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims. For instance, while the discussion has been given for minifying printing in terms of an example wherein the printing head is not used, it is possible to also use the printing head 2c, or not to use both of the printing heads 2b and 2c depending upon minifying magnification. Also, while the foregoing discussion has been given for the examples, in which the printing heads 2a, 2b and 2c are arranged in given constant interval, the intervals between the printing heads 2a, 2b, 2c may be varied arbitrarily. Furthermore, while the shown embodiment has been discussed in terms of printing of image signal (image data) read from the image sensor, the present invention is equally applicable for the case of printing of an image data input from external system, such as an external computer or so forth. In addition, while the present invention has been discussed in terms of application for enlarging copy machine, the present invention is also applicable for other recording apparatus, such as printer, facsimile machine and so forth.

What is claimed is:

1. A printing method of a recording apparatus for performing enlargement printing of one continuous line by simultaneously shifting a plurality of printing heads arranged at a given interval in a primary scanning direction by a shifting magnitude, said printing method comprising the steps of:

performing an enlarging process for image data;

setting said shifting magnitude of said printing heads in said primary scanning direction to be greater than a shifting magnitude utilized in standard printing;

setting dividing points for shifting traces of each of said printing heads such that the shifting traces of adjacent ones of said printing heads partially overlap one another;

establishing divided printing zones between said dividing points to be printed by each of said printing heads in a non-overlapping manner; and controlling a printing timing of the respective printing heads for performing an enlarging printing of the one continuous line.

2. The printing method for a recording apparatus as set forth in claim 1, wherein said given interval is constant.

3. The printing method for a recording apparatus as set forth in claim 1, wherein respective divided printing zones are set at equal lengths relative to each other.

4. The printing method for a recording apparatus as set forth in claim 1, wherein white data is printed in an overlapping range of said shifting traces of said printing heads.

5. The printing method for a recording apparatus as set forth in claim 4, wherein said white data is preliminarily stored in a memory together with said image data.

6. A printing method of a recording apparatus for performing reduction printing of one continuous line by simultaneously shifting a plurality of printing heads arranged at a given interval in a primary scanning direction by a shifting magnitude, said printing method comprising the steps of:

performing a reducing process for image data;

setting said shifting magnitude of said printing heads in said primary scanning direction to be equal to that used in standard printing;

establishing divided printing zones to be printed by at least two of said printing heads in a non-overlapping manner; and controlling a printing timing of the respective printing heads for performing a reduced printing of the one continuous line.

7. The printing method for a recording apparatus as set forth in claim 6, wherein said given interval is constant.

8. The printing method for a recording apparatus as set forth in claim 6, wherein a printing head not being used among said respective printing heads is released to a position not contacting a recording paper.

9. The printing method for a recording apparatus as set forth in claim 8, wherein the printing head not being used is released when a recording paper smaller than a recording paper to be used for standard printing is selected.

10. A printing method for a recording apparatus for performing printing of one continuous line which is printed when a plurality of spaced-apart printing heads are simultaneously shifted in a primary scanning direction by a shifting magnitude, said printing method comprising the steps of:

setting an interval between said printing heads shorter than a predetermined printing length by a first entrance length;

setting a shifting magnitude of said printing heads longer than said predetermined printing length by a second entrance length;

performing printing by a first of said printing heads which performs printing from the beginning of said one line to a shifting end position of said first printing head; and performing printing by another of said printing heads from a position on the path of movement of the first printing head to the shifting end position.

11. The printing method for a recording apparatus as set forth in claim 10, wherein when said first entrance length is Xf, said second entrance length is Xr, and a number of said printing heads is N, a relationship of Xr=(N−1)Xf is satisfied.

12. The printing method for a recording apparatus as set forth in claim 10 or 11, wherein a sum length of said first entrance length and said second entrance length is set at a length for stabilizing a transitional behavior upon initiation of shifting of said printing heads.

13. The printing method for a recording apparatus as set forth in claim 10, wherein white data is printed within an overlapping range of shifting traces of said printing heads.

14. The printing method for a recording apparatus as set forth in claim 13, wherein said white data is preliminarily stored in a memory together with image data.

* * * * *